Jan. 28, 1958  C. F. STAPLES  2,821,081
SURFACE RESISTANCE INDICATOR
Filed Oct. 19, 1956
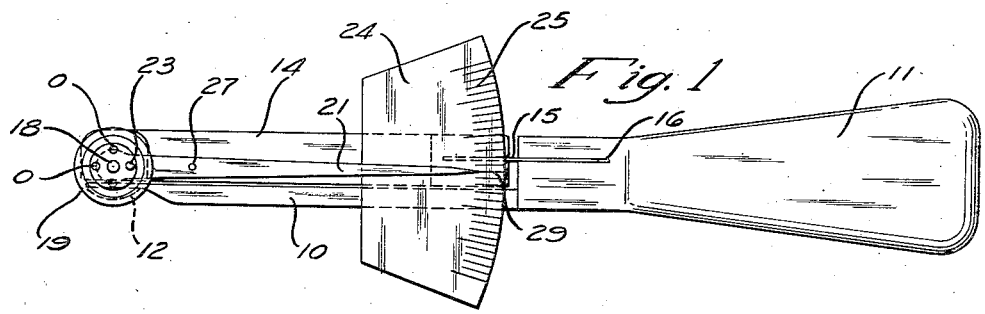
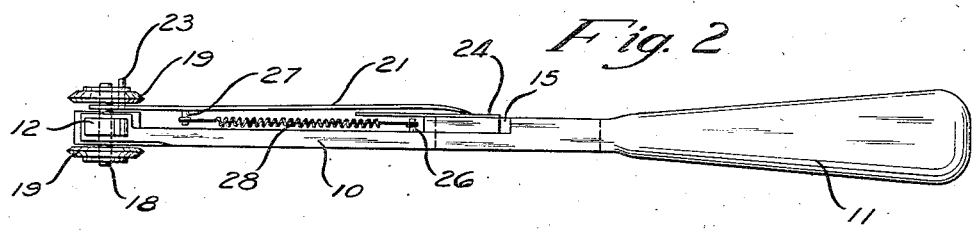
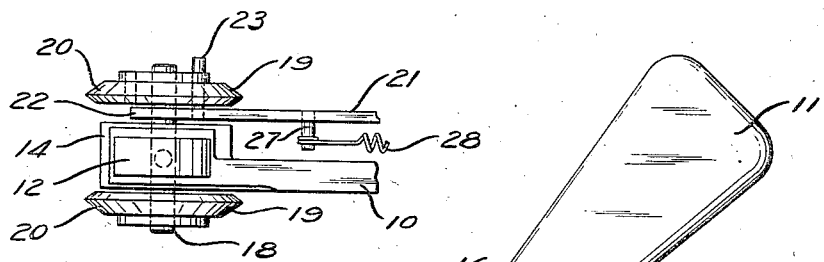
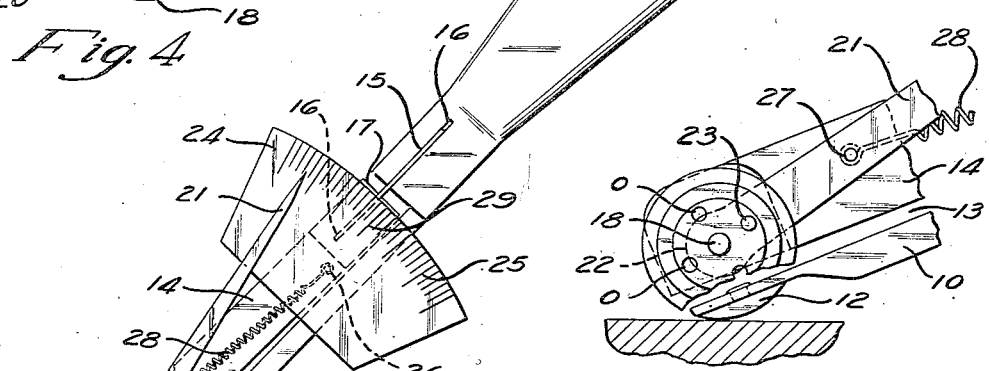
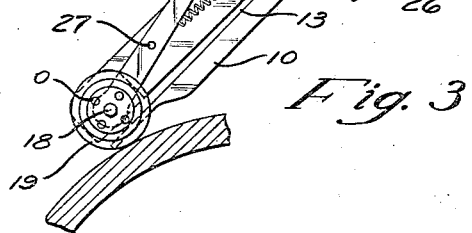
INVENTOR.
CHARLES F. STAPLES
BY
RICHEY, WATTS, EDGERTON & McNENNY
ATTORNEYS

United States Patent Office 2,821,081
Patented Jan. 28, 1958

2,821,081

SURFACE RESISTANCE INDICATOR

Charles F. Staples, Birmingham, Mich.

Application October 19, 1956, Serial No. 617,117

8 Claims. (Cl. 73—105)

This invention relates to instruments for measuring the surface resistance of machined metal parts, particularly those that have been ground, honed, lapped or otherwise finished to produce a smooth even surface.

Heretofore, numerous attempts have been made to determine the smoothness of the finish of a machined part, such efforts including generally, instruments for optical inspection, stylus controlled electronic devices, and mechanism for measuring the wear that occurs in a soft material when drawn over the face of a finished part.

All of these devices are expensive of manufacture, some are unstable and inaccurate, and many are useless except in the hands of a highly skilled operator.

The present invention eliminates all of the foregoing objections and provides, in addition, an instrument that may be used by the machine operator in situ with ease and dispatch.

Another object of the invention is to provide an instrument which is designed to indicate the drag or resistive effort offered by a soft metal disc as it is drawn, under a constant compressive pressure, over a finished surface.

Other objects of the invention reside in the provision of an instrument which is portable, rugged of structure, economic of manufacture, and efficient of operation.

Other objects and advantages more or less ancillary to the foregoing, and the manner in which all the various objects are realized, will appear in the following description, which considered in connection with the accompanying drawings, sets forth the preferred embodiment of the invention.

Referring to the drawings:

Fig. 1 is a plan view of the improved surface resistance measuring instrument;

Fig. 2 is a side elevational view thereof;

Fig. 3 is a view illustrating the position of the arm and pointer when the instrument is in use;

Fig. 4 is an enlarged fragmentary view of the forward end of the instrument; and Fig. 5 is an enlarged side elevational view of a fragmentary portion of the forward end of the instrument shown in an actuated position, and with certain parts of the instrument broken away in the interest of clarity.

Referring first to Fig. 1, the instrument comprises a lineal bar 10 having a handle 11 on one end thereof and a hardened steel arcuate anvil 12 mounted in the opposed end. The upper portion of the free end of the bar is relieved to provide a recess 13 for the reception of an arm 14 supported by a leaf spring 15 seated in kerfs 16 in the end of the arm and the shoulder 17 defined by the recess. The width of the arm is substantially equal to the depth of the recess and the thickness of the arm is the same as that of the bar. The free end of the arm is drilled to receive a pin 18 and a pair of soft metal discs 19, such as annealed copper, are affixed thereon in straddled relation with the arm. The discs are formed with beveled sides 20 and the circumferential edges thereof normally overlie the crest of the anvil 12. A pointer 21 having an enlarged hub portion 22 thereon is mounted on the pin subjacent one of the discs 19 and in parallel relation with the face of the bar. The hub 22 of the pointer is drilled in the medial axis thereof for the reception of a pin 23 snugly engaged in one of a pluralitiy of openings 0 in the disc 19. When the sharp edges of the discs become worn, the pin may be removed, the discs indexed to present a new edge, then the pin reassembled to lock the disc and pointer in keyed relation with each other. An arcuate segmental dial 24 having radial graduations 25 thereon is mounted on the bar 10 subjacent the pointer 21. The graduations extend to the edge of the dial, but the pointer terminates within the dial in order to facilitate accurate reading of the graduations relative to the position of the pointer. The arm 14 has a vertically disposed pin 26 mounted therein adjacent the shoulder 17 and the pointer 21 has a pin 27 depending from the lower face thereof adjacent the hub 22. The pins support a light contractile spring 28 designed to effect the retraction of the pointer to the center line 29 of the dial upon release of the tensive effort applied thereto through the spring 28.

When the instrument is in use, the discs 19 are placed upon the surface of the work under inspection and sufficient downward pressure is applied to the bar to outweigh the leaf spring 15 and bring the anvil 12 into contact with the work. The bar is then moved alternately forwardly and back over the work to effect rotative movement of the discs and its axle or pin 18. Readings of the position of the pointer over the graduated dial are observed during the forward and rearward movement, and these readings are averaged to determine the condition of the surface being inspected. During such reciprocative movement of the bar, the compressive effort on the discs will remain constant due to the flexure of the spring, but the axle or pin 18 will rotate slightly as the discs traverse the surface of the work and cause the pointer 21 to swing laterally over the dial. As the sharp edges of the discs encounter undulations or surface irregularities in the work, the resistance to translation is increased and the pin will rotate in its journal bearing in the arm and thus effect the movement of the pointer. When the surface of the work is smooth and free from pits, scratches or protuberances, the discs will slide over the surface without appreciable resistance and effect little if any rotary oscillation of the pin. Obviously, if the discs are hard, the frictional resistance thereof will be slight and no reading on the dial will be apparent. However, with discs having a high coefficient of friction, the drag or resistance afforded thereby will cause sufficient rotation of the pin to effect a perceptible movement of the pointer. When the edges of the soft metal discs become worn and develop flat lands of a width too great to enter the crevices in the surface of the work, the pointer may be rotated relative to discs to present new sharp circumferential edges engageable with the work when the pointer is in registration with the center line 29 on the dial.

It is essential that the size of the pointer 21 be suitably restricted to minimize the weight thereof, and that the material from which the pointer is made be light in weight in order to avoid depression of the pointer under the influence of gravity when the instrument is held in its working position, as illustrated in Fig. 3.

The bar 10 and arm 14 are preferably made from a light material such as aluminum, and although drawn copper has been referred to above as a suitable material for the discs, it is to be understood that various other materials having high frictional characteristics are contemplated as falling within the meaning and scope of the claims appended hereto.

Although the foregoing description is necessarily of a detailed character, in order that the invention may be completely set forth, it is to be understood that the specific terminology is not intended to be restrictive or confining, and that various rearrangements of parts and modifications of detail may be resorted to without departing from the scope or spirit of the invention as herein claimed.

What is claimed is:

1. An instrument for measuring the surface resistance of a finished workpiece comprising a bar, an arcuate anvil on one end thereof, an arm mounted for lateral swinging movement on said bar, a disc rotatively mounted on the end of said arm adjacent said anvil and overlying the crest of said anvil, a pointer mounted on said arm for rotative movement with said disc, spring means for the yieldable retention of said pointer on the medial axis of said arm, a graduated dial on said bar subjacent said pointer, and spring means on said bar coupled with said arm yieldingly supporting said arm in parallel relation with said bar.

2. An instrument for measuring the surface resistance of a machined workpiece comprising a bar, an anvil on one end thereof for engagement with the surface of the workpiece being inspected, an arm mounted for lateral swinging movement on said bar, a soft metal circumferentially beveled disc rotatively mounted on the end of said arm adjacent said anvil for engagement with the surface of the workpiece, a pin in said arm affixed to said disc, a pointer mounted for rotative movement with said disc, a graduated dial on said bar subjacent said pointer to show the extent of movement of the pointer, spring means for the yieldable support of said arm in parallel relation with said bar, and spring means connected to said pointer and said arm for the yieldable support of said pointer in parallel relation with the medial axis of said arm.

3. An instrument for measuring the surface resistance of a machined metallic part comprising a bar, an arcuate work engaging anvil on the lower end thereof, a strap spring on the other end of said bar parallel the medial axis thereof, an arm supported at its inner end by said spring, a pin journaled in the free end of said arm adjacent said anvil, a pair of soft metal discs for engagement with the work affixed to said pin for rotative movement therewith, sharp beveled edges on said discs, the circumference of said discs protruding beyond the crest of said anvil, a pointer mounted on said pin and keyed to one of said discs for rotative movement therewith, an arcuate dial mounted on the upper end of said bar subjacent said pointer, graduations on said dial to indicate the movement of said pointer when said discs are rotated as they are drawn over the surface of the part being examined, and a contractile spring secured to said pointer and said arm urging the pointer in aligned relation with the center line of said dial.

4. An instrument for measuring the surface resistance of a machined workpiece comprising a bar, an arcuate anvil on the lower end thereof for engagement with the work, a strap spring affixed in the opposed end of said bar, an arm supported thereby in normal parallel relation to said bar, a pin rotatively mounted in the free end of said arm, soft metal discs for engaging the work secured on said pin for rotative movement therewith, beveled edges on the circumferential edge of said discs, said discs normally protruding beyond the crest of said anvil, a pointer affixed to said pin for rotative movement therewith, a graduated segmental dial on the upper portion of said bar subjacent said pointer, and a helical spring connected to said bar and said pointer urging the pointer into axial alignment with the center of said dial.

5. An instrument for measuring the surface resistance of a machined workpiece comprising a bar, an arcuate anvil on one end thereof for engagement with the work, an arm mounted on the upper end of said bar, spring means on said bar supporting said arm for lateral swinging movement relative to said bar, a pin in the free end of said arm adjacent said anvil, a disc affixed to said pin for engagement with the work, the circumferential edge of said disc protruding beyond the crest of said anvil, a pointed affixed to said pin for rotative movement therewith, a graduated dial on said bar subjacent said pointer to show the extent of movement of the pointer, said disc being formed of a material having a high coefficient of friction, and a spring on said arm connected to said pointer and resisting rotational movement thereof.

6. An instrument for measuring the surface resistance of a machined workpiece comprising a bar, an anvil on one end thereof for engagement with the work, an arm mounted for lateral swinging movement on said bar, a copper disc for engagement with the work rotatively mounted on the end of said arm adjacent said anvil, the circumferential edge of said disc protruding beyond the crest of said anvil, a pointer mounted on said arm for rotative movement with said disc, a graduated dial on the upper portion of said bar subjacent said pointer, spring means on the upper end of said bar coupled with the upper end of said arm for yieldingly supporting the arm in parallel relation with said bar, and spring means on said arm coupled with said pointer for yieldably resisting rotative movement thereof.

7. An instrument for measuring the surface resistance of a machined metal workpiece comprising a bar, an arcuate anvil on one end thereof for engagement with a workpiece, a leaf spring on the upper end of said bar, an arm supported thereby, a pin journaled in the free end of said arm adjacent said anvil, a soft metal disc for engagement with workpieces affixed on said pin, beveled edges on said disc normally protruding beyond the crest of said anvil, a pointer affixed to said pin and keyed to said disc for simultaneous rotation therewith, a contractile spring attached to said pointer and said arm for yieldably holding the pointer in parallel relation with the medial axis of said arm, and a graduated arcuate scale on said bar below said pointer for indicating the movement of said pointer and thus showing the resistance offered by said disc as it is drawn over the surface of the work.

8. An instrument for measuring the surface resistance of a machined workpiece comprising a bar, an anvil on the free end thereof, a leaf spring on the upper end portion of said bar disposed in parallel relation with the axis of said bar, an arm supported by said spring, a pin rotatively mounted in the free end of said arm, a circular soft metal disc for engagement with the workpiece affixed on said pin, the circumferential edge of said disc protruding beyond the lower face of said anvil, a pointer mounted on said pin and removably keyed to said disc, a contractile spring on said arm and connected to said pointer to yieldably resist lateral movement thereof, and a graduated segmental dial on the upper end portion of said bar subjacent said pointer to show the extent of the movement of said pointer.

References Cited in the file of this patent
FOREIGN PATENTS

| | | |
|---|---|---|
| 449,096 | Great Britain | June 22, 1936 |
| 653,085 | Great Britain | May 9, 1951 |